United States Patent
Burges et al.

(10) Patent No.: US 7,379,875 B2
(45) Date of Patent: May 27, 2008

(54) SYSTEMS AND METHODS FOR GENERATING AUDIO THUMBNAILS

(75) Inventors: Christopher J. C. Burges, Bellevue, WA (US); John C. Platt, Redmond, WA (US); Daniel Plastina, Sammamish, WA (US); Erin L. Renshaw, Kirkland, WA (US); Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 10/785,560

(22) Filed: Feb. 24, 2004

(65) Prior Publication Data
US 2005/0091062 A1 Apr. 28, 2005

Related U.S. Application Data

(60) Provisional application No. 60/514,490, filed on Oct. 24, 2003.

(51) Int. Cl.
*G06F 7/00* (2006.01)
*G10L 11/00* (2006.01)

(52) U.S. Cl. ............ 704/273; 704/231; 704/243; 704/270; 707/9; 700/94; 713/176

(58) Field of Classification Search ............. 707/100; 700/94; 704/273
See application file for complete search history.

(56) References Cited

U.S. PATENT DOCUMENTS

| | | | | |
|---|---|---|---|---|
| 4,241,329 A * | 12/1980 | Bahler et al. | ............... | 704/231 |
| 4,567,606 A * | 1/1986 | Vensko et al. | ............... | 704/251 |
| 5,313,556 A * | 5/1994 | Parra | ............... | 704/246 |
| 5,386,493 A * | 1/1995 | Degen et al. | ............... | 704/267 |
| 5,414,796 A * | 5/1995 | Jacobs et al. | ............... | 704/221 |
| 5,781,888 A * | 7/1998 | Herre | ............... | 704/200.1 |
| 6,185,527 B1 * | 2/2001 | Petkovic et al. | ............... | 704/231 |
| 6,434,520 B1 * | 8/2002 | Kanevsky et al. | ............... | 704/243 |
| 6,493,709 B1 * | 12/2002 | Aiken | ............... | 707/4 |
| 6,505,160 B1 * | 1/2003 | Levy et al. | ............... | 704/270 |
| 6,535,851 B1 * | 3/2003 | Fanty et al. | ............... | 704/249 |
| 6,542,869 B1 * | 4/2003 | Foote | ............... | 704/500 |
| 6,606,744 B1 * | 8/2003 | Mikurak | ............... | 717/174 |
| 6,763,136 B1 * | 7/2004 | Sweet | ............... | 382/197 |
| 6,933,432 B2 * | 8/2005 | Shteyn et al. | ............... | 84/649 |
| 6,963,975 B1 * | 11/2005 | Weare | ............... | 713/176 |

(Continued)

OTHER PUBLICATIONS

Matthew Cooper, et al., Automatic Music Summarization via Similarity Analysis, In Proc. ISMIR, 2002, 6 pages.

(Continued)

*Primary Examiner*—Talivaldis Ivars Smits
*Assistant Examiner*—Michael C Colucci
(74) *Attorney, Agent, or Firm*—Amin, Turocy & Calvin, LLP (57) ABSTRACT

The present invention relates to a system and methodology to facilitate automatic generation of mnemonic audio portions or segments referred to as audio thumbnails. A system is provided for summarizing audio information. The system includes an analysis component to determine common features in an audio file and a mnemonic detector to extract fingerprint portions of the audio file based in part on the common features in order to generate a thumbnail of the audio file. The generated thumbnails can then be employed to facilitate browsing or searching audio files in order to mitigate listening to longer portions or segments of such files.

32 Claims, 7 Drawing Sheets

U.S. PATENT DOCUMENTS

| | | | |
|---|---|---|---|
| 6,990,453 B2 * | 1/2006 | Wang et al. | 704/270 |
| 7,013,301 B2 * | 3/2006 | Holm et al. | 707/9 |
| 7,047,194 B1 * | 5/2006 | Buskies | 704/258 |
| 7,082,394 B2 * | 7/2006 | Burges et al. | 704/243 |
| 2002/0062209 A1 * | 5/2002 | Choi | 704/208 |
| 2003/0021472 A1 * | 1/2003 | Nichogi et al. | 382/166 |
| 2003/0086341 A1 * | 5/2003 | Wells et al. | 700/94 |
| 2003/0088412 A1 * | 5/2003 | Shetty et al. | 704/243 |
| 2004/0064209 A1 * | 4/2004 | Zhang | 700/94 |
| 2004/0073554 A1 * | 4/2004 | Cooper et al. | 707/100 |
| 2004/0196989 A1 * | 10/2004 | Friedman et al. | 381/119 |
| 2004/0260682 A1 * | 12/2004 | Herley et al. | 707/3 |

OTHER PUBLICATIONS

Jonathan T. Foote, et al., Media Segmentation using Self-Similarity Decomposition, Proceedings of SPIE2003, 2003, 9 pages.

Beth Logan, Mel Frequency Cepstral Coefficients for Music Modeling, Compaq Computer Corporation, 2000, 11 pages.

Christopher Burges, et al., Duplicate Detection and Audio Thumbnails with Audio Fingerprinting, Microsoft Research, Mar. 2004, 5 pages.

Christopher Burges, et al., Distortion Discriminant Analysis for Audio Fingerprinting, IEEE Transactions on Speech and Audio Processing, 2003, pp. 165-174, vol. 11- No. 3.

Jonathan Goldstein, et al., Indexing High Dimensional Rectangles for Fast Multimedia Identification, Microsoft Research, 2003, 11 pages.

Christopher Burges, et al., Identifying Audio Clips with Rare, MM'03, 2003, pp. 444-445, Berkeley, California, USA.

Christopher Burges, et al., Extracting Noise-Robust Features from Audio Data, Microsoft Research, 2002, 4 pages.

Yuen-Hsien Tseng, Content-Based Retrieval for Music Collections, SIGIR '99, 1999, pp. 176-182, Berkley, California, USA.

* cited by examiner

SYSTEMS AND METHODS FOR GENERATING AUDIO THUMBNAILS

RELATED APPLICATIONS

This application claims priority to U.S. Provisional Patent Application Ser. No. 60/514,490 filed on, Oct. 24, 2003 and entitled DUPLICATE DETECTION AND AUDIO THUMBNAILS WITH AUDIO FINGERPRINTING.

TECHNICAL FIELD

The present invention relates generally to computer systems, and more particularly to a system and method that employs audio fingerprints to determine common or repetitive elements within audio files in order to generate mnemonic audio thumbnails or clips that facilitate browsing of audio files or for other purposes.

BACKGROUND OF THE INVENTION

One of the current features supported by many modern software systems is the ability to store and play audio files. Many of these systems enable users to store and manage differing collections of audio files. As time passes however, many users become frustrated with the large amount of data that inevitably takes up larger amounts of storage space. Also, as collections become larger, it becomes more difficult and time consuming to retrieve and play desired audio information. Many systems offer software to help users manage these ever increasing volumes of audio information. For example, these systems may include an audio manager that supports popular audio file formats, including MP3, Ogg Vorbis (OGG), Windows Media Audio (WMA), MPC and MP+ files, and so forth. This enables users to catalog their entire collection of audio files and instantly search for favorite songs, browsing albums using the album cover as a thumbnail, creating reports and other useful features.

In addition to organizing audio files, these systems provide a set of tools to manage files by editing tags, changing names, editing lyrics, creating CDs, and looking up artist information, for example. Users can work with audio files stored on hard discs, CD-ROMs, network drives, ZIP drives or any other removable media. This includes tools that allow users to play multiple play lists and display images associated with each title. Additional features include automatically generated database statistics, personal ratings, sorting by genre, mood, year, and custom database queries.

Audio fingerprinting (AFP) has recently emerged as a powerful method for identifying audio, either in streams or in files. Several companies now offer music services based on audio fingerprinting. These services require that one or more fingerprints be extracted from the audio to be identified, and that these fingerprints be checked against a large database of previously-computed fingerprints.

Managing large audio collections is difficult, however, since it's not currently possible to quickly parse audio files (as opposed to images, for which thumbnails can be used). Users generally must rely on labeling, but even that is of limited help: often the labeling is inaccurate, but even with accurate labeling, users may not remember a given song until they hear it. If a user can't remember what a song sounds like, they usually must play it, and then stop play when they have recognized the music. In addition, some scenarios require a 'hands-off' approach to music selection: for example, one may desire to browse an audio collection, while driving, to select a song.

Previous efforts have attempted to summarize music to alleviate the problem of music browsing. However, these previous efforts have concentrated on computing features from single frames of audio. These frames are typically 16-30 milliseconds long. The previous efforts compute similarity between such frames. This similarity will necessarily be crude, due to the inadequate information available to the similarity metric.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for generating audio thumbnails. The subject invention addresses the problem of presenting a mnemonic 'audio thumbnail' to the user, in order to facilitate browsing, or to summarize audio for other purposes. Thumbnails are short (typically about 15 seconds or less), but are extracted from a portion of a song or audio file that the user is most likely to remember. Thus, the present invention operates in part by determining parts of an audio that approximately repeat within an audio clip. For example, if a song has a chorus, and copies of the chorus are sufficiently similar, the system can identify the chorus, and construct a segment of audio that is highly mnemonic of the original. In order to find approximate repeats, the present invention uses a fingerprinting component whose output is based (in part) on multiple frames of transformed audio data.

In addition to the fingerprinting component, the system can also employ a measure of spectral flatness, and a measure of spectral energy, to decide between different portions of audio that repeat. Also, the system can exploit these measures to identify a mnemonic section of the audio even if the audio does not contain repetitious sections. When the system has identified a mnemonic section, it extracts a segment (in one aspect, 15 seconds is used) from around that position in the file. This extracted section (or equivalently, pointers into the audio file which determine where in the audio file the identified segment is) is used as the 'audio thumbnail.'

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate automatic generation of mnemonic audio portions or segments referred to as audio thumbnails. The present invention supercedes older music summarization techniques by computing fingerprints based (in part) on information contained in multiple frames. Thus, fingerprints have much more information and similarity between them is much less noisy. A system is provided for summarizing audio information. The system includes an analyzer to convert audio into frames and a fingerprinting component to convert the frames into fingerprints, each fingerprint based in part on a plurality of frames. A similarity detector computes similarities between fingerprints, wherein a heuristic module to generates a thumbnail of the audio file, based in part on the similarity between fingerprints. The system includes an analysis component to determine common features in an audio file and a mnemonic detector to extract fingerprint portions of the audio file based in part on the common features in order to generate a thumbnail of the audio file. The generated thumbnails can then be employed to facilitate browsing or searching audio files in order to mitigate listening to longer portions or segments of such files.

As used in this application, the terms "component," "object," "generator," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
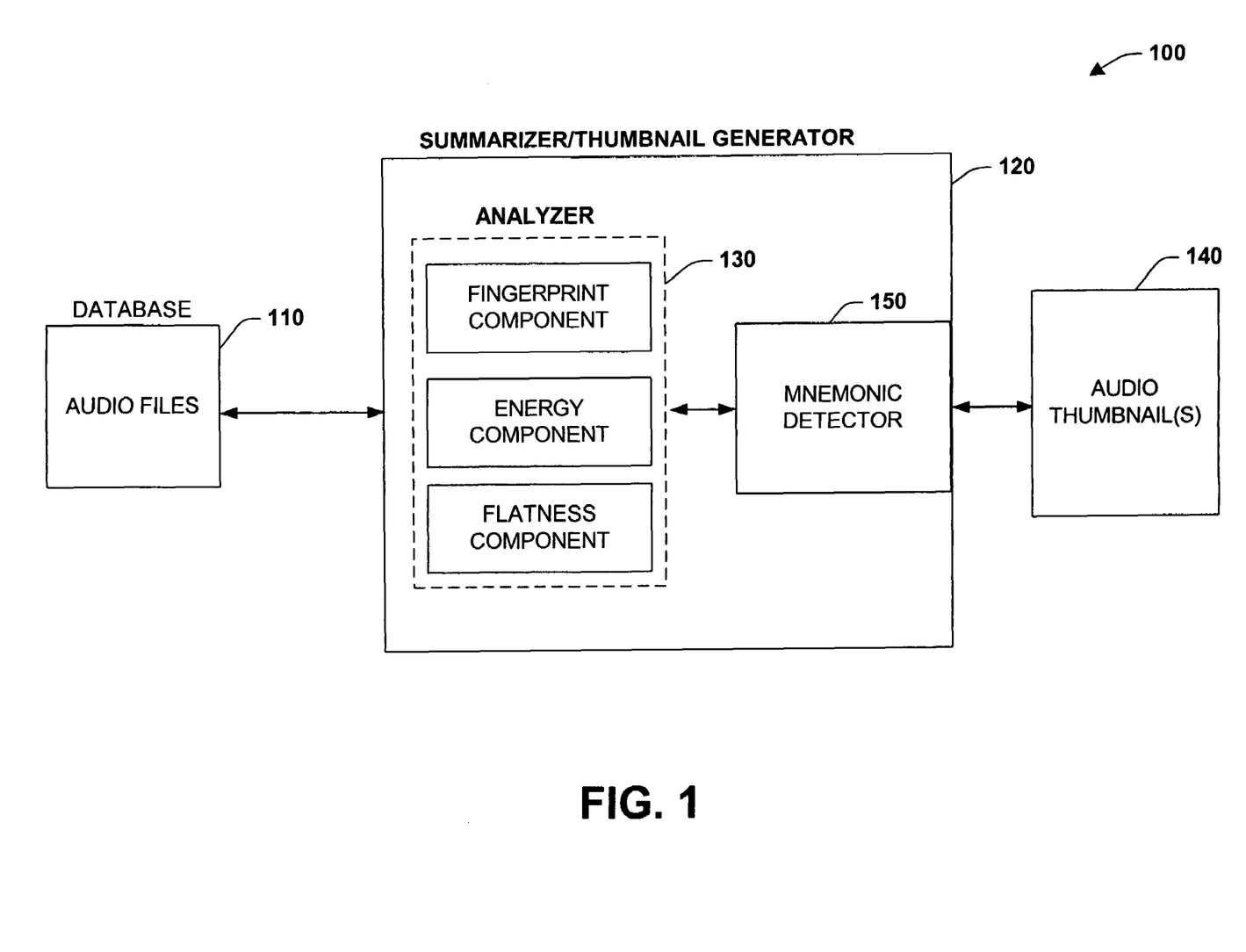
FIG. 1 is a schematic block diagram of an audio thumbnail generator system in accordance with an aspect of the present invention.

Referring initially to FIG. 1, an audio thumbnail generator system 100 is illustrated in accordance with an aspect of the present invention. The system 100 includes a database 110 of audio files that is processed by a summarizer 120 which is also referred to as an audio thumbnail generator. The generator 120 includes an analyzer 130 that processes the audio files in order to determine components, segments, or portions of the audio files 110 that are suitable as an audio thumbnail 140. The audio thumbnail 140 is generally a short clip or segment of audio that is likely to remind a user of the larger contents of the audio file 110 (e.g., chorus with words "Goodbye Yellow Brick Road" reminding user of Elton John's song of same name when played as a thumbnail).

A mnemonic detector 150 operates with the analyzer 130 to determine which portions of the audio files 110 are to be employed as the audio thumbnail 140. As illustrated, the analyzer 130 includes a fingerprint component for analyzing streams of audio information, an energy component and/or a flatness component to further process the audio files in order to determine a suitable segment of audio for the thumbnail 140. It is noted that the components within the analyzer 130 may be employed in varying combinations and degrees in order to determine the thumbnails 140.

Figure 4:
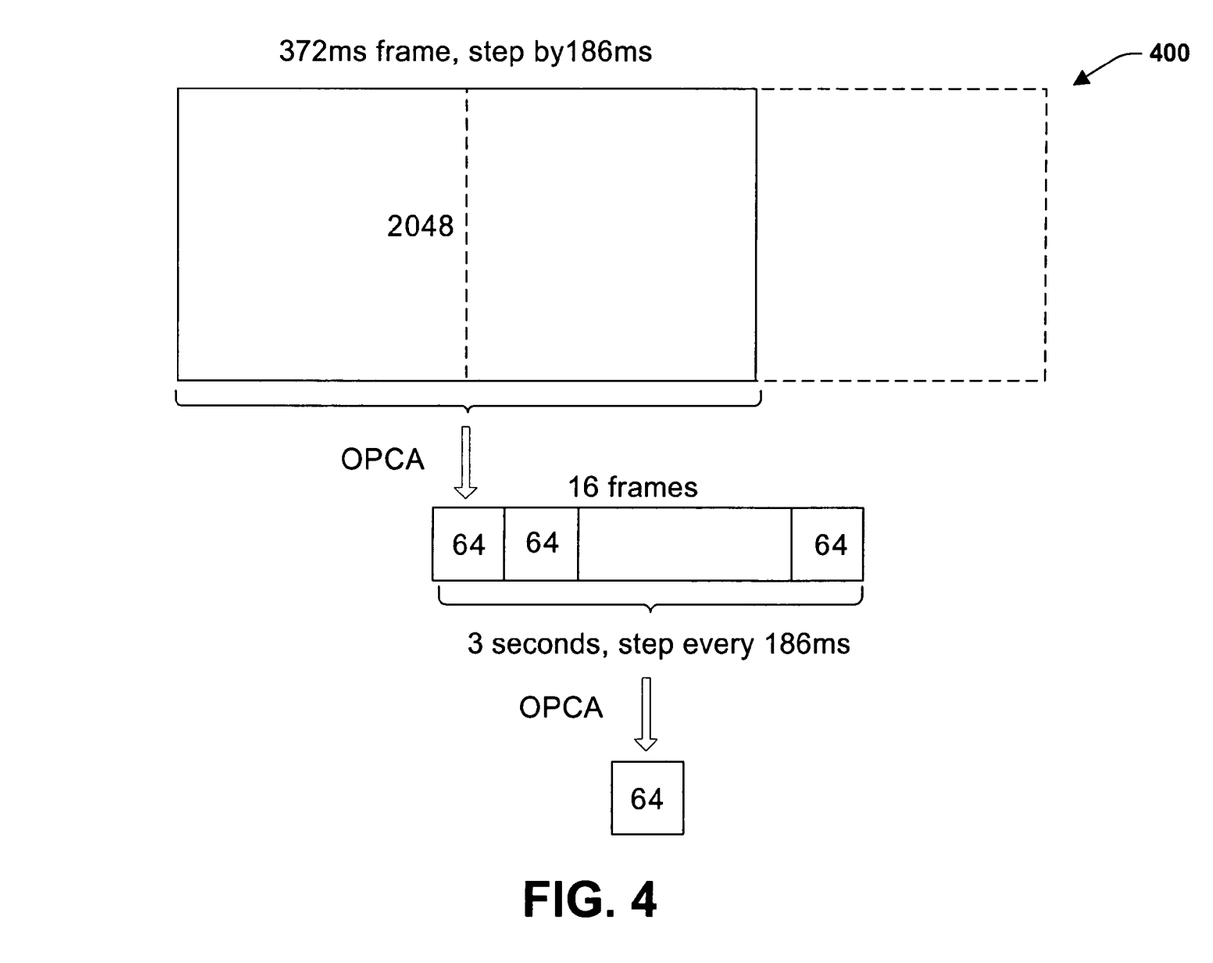
FIG. 4 is a diagram illustrating distortion discriminant analysis in accordance with an aspect of the present invention.
Figure 5:
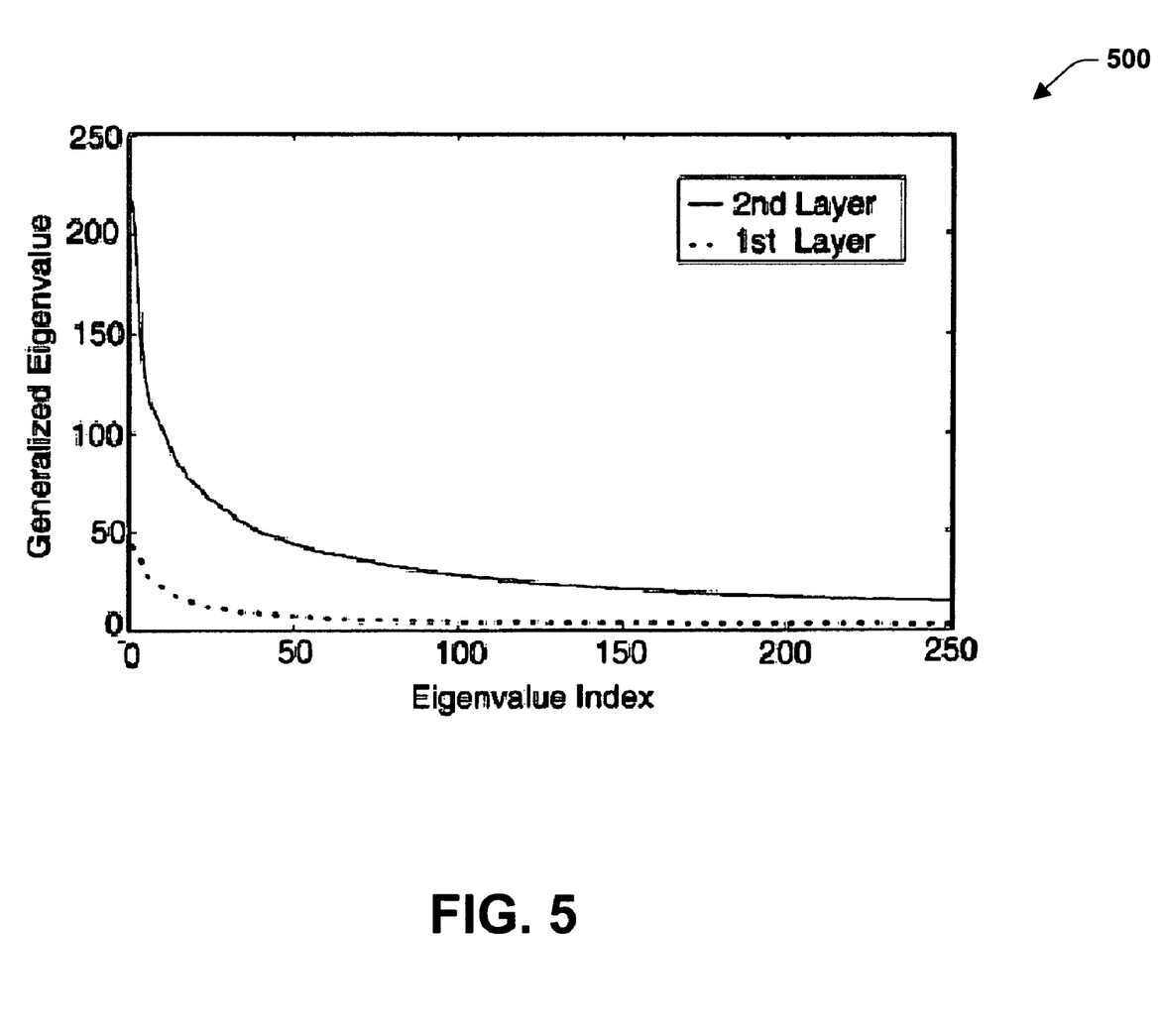
FIG. 5 is a diagram illustrating generalized eigenvalues in accordance with an aspect of the present invention.

In general, the system 100 employs audio fingerprinting to locate repeating sections of audio. One concept is that similar sections of music generate similar fingerprints. Thus, by using the fingerprints, rather than using the original audio, the present invention provides the advantage that slightly different variations provide very similar fingerprints, and thus fingerprints are more robust than using the original audio. Furthermore fingerprints have the advantage that they integrate information extracted from much larger temporal windows than previously used in the art, and so are more robust. Fingerprints also have the additional advantage that they are very low dimensional representations of the original music, and thus processing these entities is more efficient in terms of memory and CPU usage. The discussion with respect to FIGS. 3-5 provide more detail on fingerprint processing in accordance with the present invention.

Figure 2:
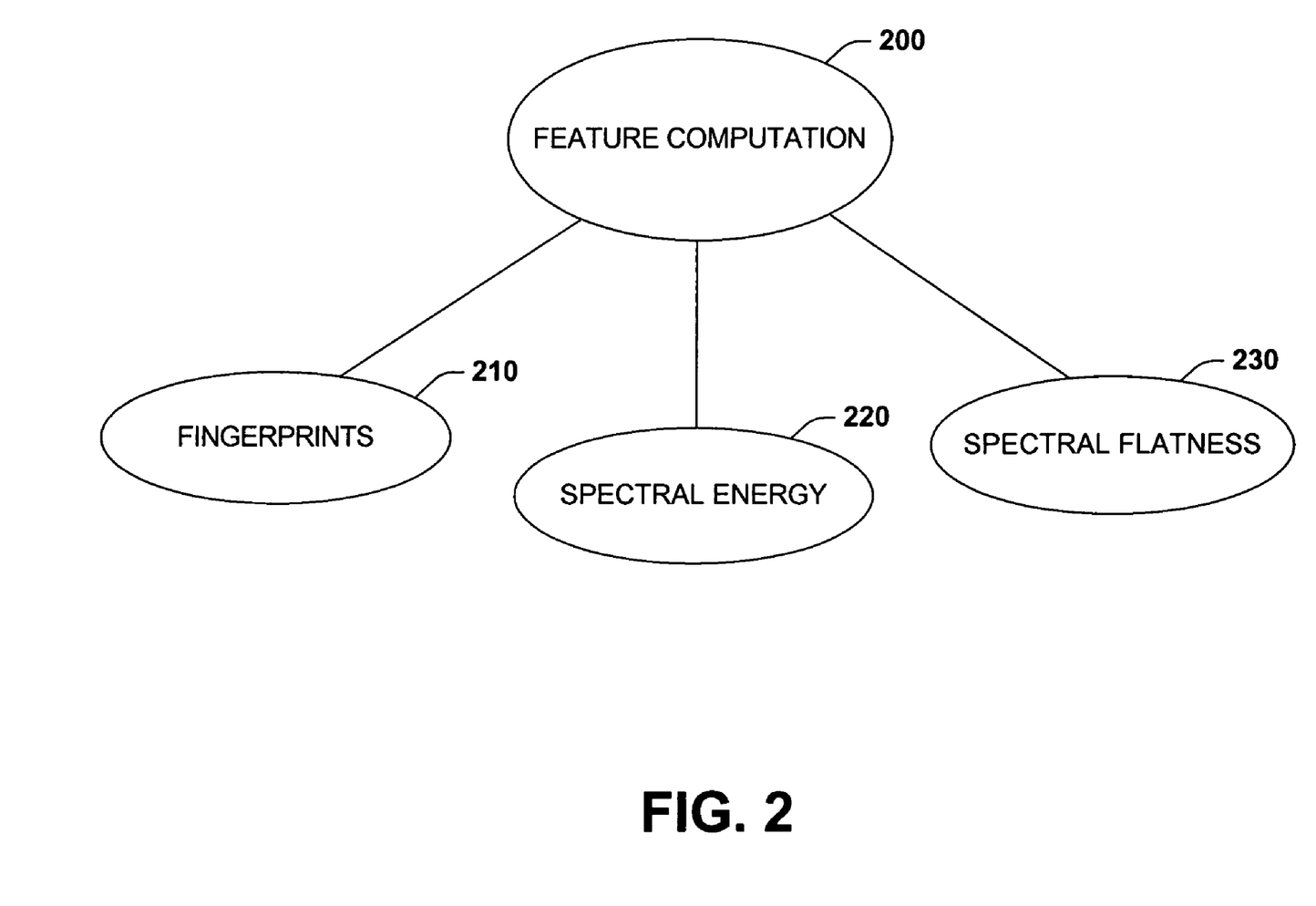
FIG. 2 is a diagram illustrating feature computation in accordance with the present invention.
Figure 3:
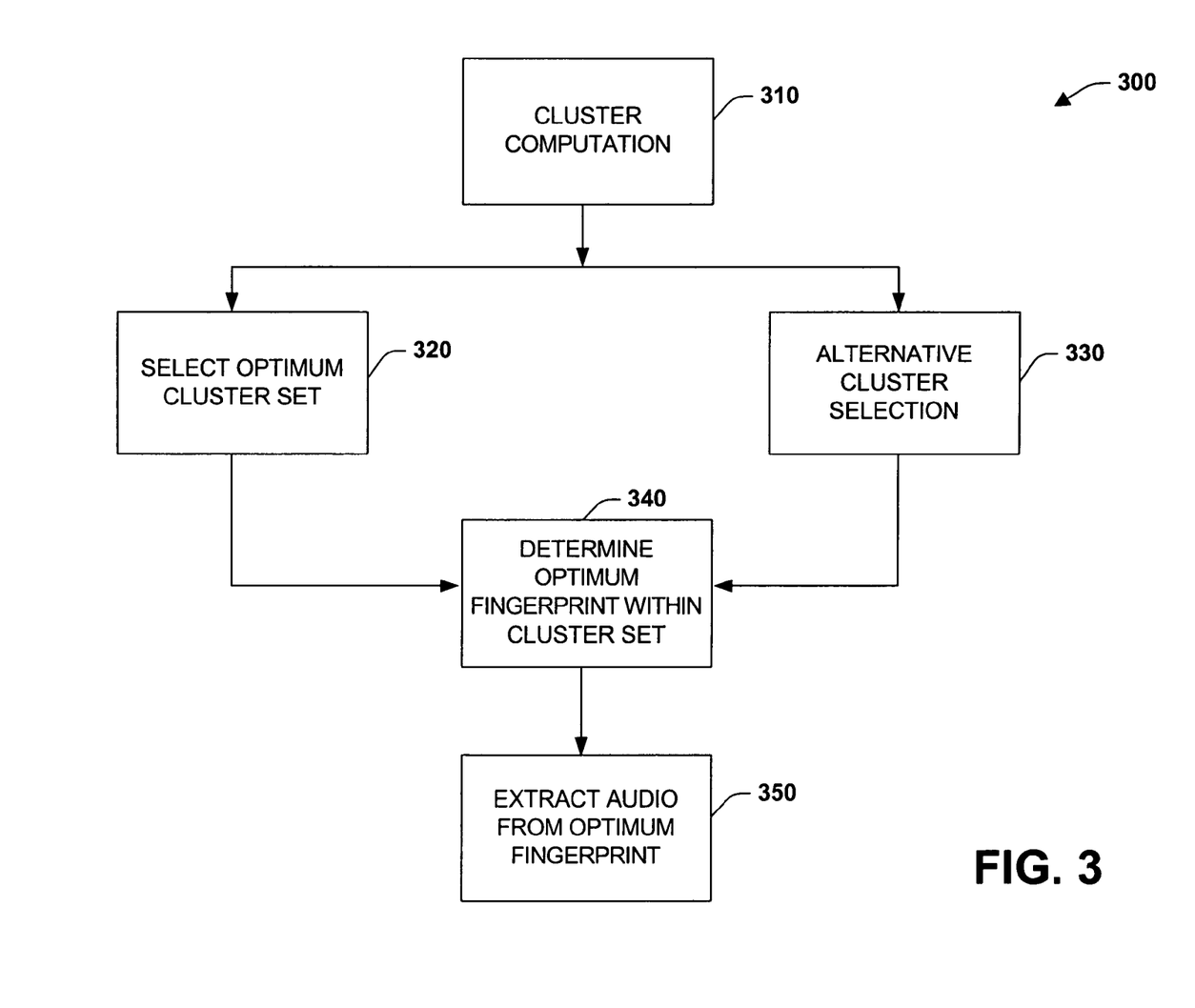
FIG. 3 is a flow diagram illustrating audio thumbnail processing in accordance with the present invention.

Various techniques are possible for identifying audio sections that may be employed as audio thumbnails 140 (See FIGS. 2-3). The following description provides details of an implemented system, yet it is to be appreciated that this is merely an example of such a system. For instance, the implemented system utilizes fingerprints of duration 3 seconds (or other time), and steps between a start point of subsequent fingerprints of 186 ms (or other time). Another system utilizes 6 second fingerprints, however the fingerprinting system can generate fingerprints of arbitrary length, and 3 seconds is a suitable match for chorus detection.

In the system 100, there are three basic objects involved in the computation of an audio thumbnail which are included in the analyzer 130: a fingerprint and associated normalization (A), a measure of energy in the audio from which the fingerprint was computed, (B), and a measure of spectral flatness in the audio from which the fingerprint was computed (C). One aspect is to use these features to enable the system to automatically select voiced choruses over purely instrumental, repeated phrases, since voiced choruses are believed to be more mnemonic than purely instrumental repeats. Also, features (B) and (C) can be employed when the (A) features do not result in finding a suitable chorus. Current systems compute fingerprints that are approximately 3 seconds long by concatenating 16 windows of 372 ms, each overlapping by half (i.e., 186 ms). All three quantities (A,B,C) can be computed using these 372 ms frames (or other time frame). It is noted that before these features are computed in the analyzer 130, silence at the beginning and end of a clip can be removed using a straightforward energy-based threshold.

Referring now to FIG. 2, feature computation 200 and associated processing aspects are illustrated in accordance with the present invention. In this aspect, the quantities A, B, and C described above with respect to the analyzer component are described in more detail. At 210, fingerprints are computed, for example, as described with respect to FIGS.

4-6. In one example, a fingerprint is computed for each 3 second window, stepping by 186 ms, in the audio clip (or other sampling rates). For each fingerprint, a normalization is computed, such that the average Euclidean distance from that fingerprint to other fingerprints for that audio clip is one. This also differs from how normalizations are usually computed for systems that use fingerprinting for retrieval tasks: here, only audio within the clip is used, since fingerprints will typically only be compared with other fingerprints extracted from the same clip.

At 220, the spectral energy of audio is processed. The computation of a fingerprint generally requires computing a set of spectral magnitudes for each frame. The spectral magnitudes can be computed via a modulated complex lapped (MCLT) transform operator, for example. Spectral Energy 220 and Spectral Flatness 230 described below use the average spectral magnitude as a normalization factor (so that the features generated by 220 and 230 do not depend on the overall volume level of the audio). For each frame, a mean, normalized energy E is computed by dividing the mean energy per frequency component within the frame by the average of that quantity over the frames in the clip. The average energy is averaged over all the frames that contribute to a given fingerprint (16 in this example). This quantity can be computed efficiently by using a running average. Thus, spectral energy 220 is a measure of spectral energy, per fingerprint.

At 230, a quantity of spectral flatness may be determined. For instance, consider first the computation of this quantity for a given frame, wherein a very small number (e.g., $10^{-10}$) is added to the spectral magnitude for each frequency component, to mitigate numerical problems when taking logs. The frame-quantity computed is the log normalized geometric mean of the magnitudes. This is computed as the log of the geometric mean of the magnitudes, minus the log of the arithmetic mean of the spectral magnitudes. It is noted that this results in a quantity that is bounded above by zero, since the geometric mean is less than or equal to the arithmetic mean. Thus, if the spectral energy is spread evenly throughout the spectrum, then this quantity will be much larger than if it is concentrated across a few frequency components.

For some types of audio, it has been found that high values of this quantity indicate a 'full' sound (e.g., for audio where vocals dominate the sound when singing is occurring, this quantity is high during the singing). As for the spectral energy 220, this quantity 230 is computed per fingerprint, by averaging over all frames that contribute to that fingerprint. Thus, 230 is a measure of spectral flatness, per fingerprint.

FIG. 3 is a flow diagram illustrating audio thumbnail processing in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 310, cluster computations are considered. A 'cluster' can be defined as a number of fingerprints that are clustered in time, and that represent a contiguous section of the music that repeats somewhere in the audio clip. To describe the cluster computation, the notions of a 'cluster set S' and of a 'multiplicity M' of the cluster set S are introduced. Each set S can contain zero or more integers which index the fingerprints (where the first computed fingerprint, whose start corresponds to the beginning of the audio clip, has index 1, and the second fingerprint, whose start corresponds to the beginning of the audio clip plus half a frame, had index 2, and so forth).

By 'adding a fingerprint to a set', this includes adding the index of that fingerprint to that set. The multiplicity M of a given set is the number of clusters contained in that set. For example, if a set contains integers 1, 2, 3, 100, 101, 102, then the multiplicity could be 2, because this set contains two clusters (one corresponding to fingerprint indices 0, 1, 2, and the other corresponding to fingerprint indices 100, 101, 102). Each fingerprint also has an 'AccountedFor' Boolean flag associated with it, whose default value is 'false.'

Generally, all sets are empty. The first fingerprint $F_1$ (i.e., the fingerprint corresponding to the first 3 seconds of the audio clip) is then entered into set 1 ($S_1$). All remaining fingerprints are then examined. For each remaining fingerprint $F_i$, it is also added to $S_1$, if and only if $F_1$ and $F_i$ satisfy conditions: (1) the normalized Euclidean distance between $F_1$ and $F_i$ lies below an initial threshold T, where the normalized Euclidean distance is the Euclidean distance divided by the normalization factor for $F_1$, and (2) the duration between the point in the audio corresponding to the beginning of $F_1$ and the point in the audio corresponding to the beginning of $F_i$ exceeds a second, fixed threshold Z (for example, Z=6 seconds). Condition (2) is typically required because adjacent fingerprints can have a normalized Euclidean distance that falls below T, but pieces of the audio should be determined that sound the same but that are separated in time. When the remaining fingerprints have been compared to $F_1$ in this manner, a second loop is performed, recursively adding to the set all fingerprints that satisfy the above conditions when compared with any fingerprint already in the set.

When a fingerprint is added to a set, its 'AccountedFor' flag is set to true, and it is removed from the collection of fingerprints being considered for addition to any set. The above phase then repeats, creating a new set for the first fingerprint for which the 'AccountedFor' flag is not yet set, and adding fingerprints as above. This continues until all fingerprints are members of one (and only one) set (and all 'AccountedFor' flags are true). Thus, the assignment of fingerprints to sets forms a partition of the set of all fingerprints. For each set, the corresponding multiplicity is computed. This is achieved by ordering the fingerprints sequentially and then searching for gaps in the ordering that correspond to at least Z seconds. The number of clusters is then the number of such gaps which have a fingerprint at each end, plus one.

All of the above is performed for an initial value of the threshold T. At this point, the maximum multiplicity is checked for a value of at least three (i.e., that there exists at least one cluster set containing at least three clusters). If this is not true, T is incremented by a small amount, and the cluster sets are recomputed. This process continues until either a set with at least 3 clusters has been found, or until T reaches an upper bound. In this manner, the requirements are gradually loosened on what is required to be a member of a cluster in an attempt to find at least 3 clusters. It may happen that this process results in cluster sets all of which contain only 2 clusters, in which case they will be used in the process described below, or in cluster sets of which contain only 1 cluster, in which case the audio thumbnail will be computed using the energy measures described below.

At 320, an optimum cluster set is determined. At this point, assuming that the above clustering 310 did result in one or more cluster sets containing at least 2 clusters, the remaining tasks are to select a suitable cluster set, where "suitable" means "likely to contain a fingerprint index corresponding to a chorus or repeat instrumental", and to use that fingerprint to select a suitable 15 seconds (or other amount of time) from the audio clip, where that 15 seconds will be the audio thumbnail.

To compute a suitable cluster set, the measures (B) and (C) described above (FIG. 1), are combined with a third measure, which measures how evenly spread throughout a song the clusters are (call this measure (D)). For example, if 3 clusters were found, but all lie within the first 20 seconds of the song, it is unlikely that those clusters are choruses, whereas if 3 clusters are found, and they are evenly spaced throughout the song, then it is more likely that those clusters are choruses. The quantity (D) is measured for each set found. For a given set, (D) is measured as follows. Consider the case for a given cluster set where N clusters have been found. First, the entire audio file is normalized to have duration equal to 1. Let the time position of the i'th cluster be $t_i$. Define $t_0=0$ and $t_{N+1}=1$. Then quantity (D) is computed as:

$$\frac{(N+1)}{N}\left(1 - \sum_{i=1}^{N+1}(t_i - t_{i-1})^2\right).$$

Quantity (D) has the following properties: first, since $$\sum_{i=1}^{N+1}(t_i - t_{i-1}) = 1,$$

and since $t_i \geq t_{i-1}$ $\forall i$, the differences $t_i - t_{i-1}$ can be interpreted as probabilities, and so (D) is proportional to the Renyi entropy for the corresponding distribution (with an additive offset). Thus, in this sense, selecting a clustering with a larger (D) value corresponds to choosing a clustering that is more evenly spread (since the maximum entropy is known to be found when all probabilities take the same value, for any discrete distribution). It is emphasized that the $t_i - t_{i-1}$ are only interpreted as probabilities to show that maximizing (D) is equivalent to selecting the most evenly spread clusters; this probabilistic interpretation is not used elsewhere. Second, the offset and scaling factor have been chosen so that (D) takes the maximum value of 1 and minimum value of 0, for any N. This allows the quality of the spread of sets of clusters to be compared between cluster sets, even when those sets contain different numbers of clusters. In addition, it allows prior knowledge to be easily applied as to which multiplicities to favor (e.g., choose multiplicities of 3, 4 or 5 by giving them slightly higher weight than other multiplicities, since choruses are more likely to occur that many times).

Although the geometric means feature, (C) above, is predictive of sections of audio containing voice in some cases, in other cases (for example, where the singing does not stand out acoustically from the rest of the music) it may not. However in the latter case, the quantity (C) tends to not vary significantly throughout most of the audio clip, whereas in the former case, it does vary significantly throughout the audio clip. In order to account for this, the standard deviation of the per-fingerprint log geometric mean was computed for the middle third of a set of validation songs (for those fingerprints whose energy measure (B) was above threshold, to avoid bias due to silence during a song). The middle third was used to mitigate bias due to the beginning and end of songs having low values for (C) due to musically quiet introductions and fades.

At this point, let $s_{max}$ and $s_{min}$ be the maximum and minimum standard deviations of the per-frame feature (C) found in the validation set. Define the linear mapping (a, b) by $as_{min}+b=0$ and $as_{max}+b=1$ (so parameters a and b are fixed by the validation set). Assume that an audio thumbnail is to be computed for a new song: the standard deviations of its per-frame values of (C) is computed and the linear mapping y=as+b is applied. Replace y by 1 if y>1, and replace y by 0 if y<0. Then for that song, linearly map the values (C) for the song to the interval [0, y]. Then, each set is ascribed a mean spectral quality, which is the mean of the scaled values (C) for the fingerprints in that set. The result of this scaling, when combined with the measure of cluster quality (D) (which takes the maximum value 1), will be, for example, to lower the influence of feature (C) in choosing the thumbnail for those songs for which feature (C) does not vary appreciably across the song.

Thus, each set now has two numbers associated with it: one measures cluster spread quality, and varies from 0 to 1, and the other measures spectral spread quality, and varies from 0 to y, where y is at most 1, and where y is large for those songs whose variance in their spectral spread is large. The "best" or optimum set is chosen to be that one for which the sum of the square of these two numbers is the highest. For those songs for which the spectral spread (geometric mean) quantity has small variance (compared to the validation set), y will be small, and therefore the value will have less weight when combined with the cluster spread quality. For those songs for which the spectral spread (geometric mean) quantity has large variance (compared to the validation set), y will be approximately one, and therefore the value will have approximately the same weight as the cluster spread quality when combined with the latter.

Proceeding to 330, an alternative selection of clusters can be considered. In this aspect, the clustering can be performed by finding the longest section of audio within the clip that repeats anywhere in that clip. When the cluster sets have been computed as above, this can be achieved efficiently by filling a vector, whose size is equal to the number of fingerprints, with zeros, then replacing the zero by one for each fingerprint that occurs in a set of multiplicity at least 2, and finally performing a run length encoding on the vector to find the longest string of ones. The corresponding fingerprints are then taken to correspond to the best cluster.

At 340, the optimum fingerprint is determined from the cluster set determined above. Thus, the task remains to find the best cluster within that set, and then to find the best fingerprint within that cluster, and to extract the audio surrounding that fingerprint as the audio thumbnail. Various heuristics can be used at this point. In one example, clusters that are too close to the beginning or end of the song are rejected; clusters for which the energy (measure (B) above) falls below threshold for any fingerprint in a 6 second window around the cluster are rejected; finally, that fingerprint is chosen (from those fingerprints that survive the above tests) which has the highest average spectral flatness measure (C) in the 15 seconds surrounding that fingerprint.

In the event that the above processing fails (for example, if no cluster sets of multiplicity greater than 1 were found), the best fingerprint is computed using the two energy measures (B) and (C) above, as follows: only those fingerprints are considered whose energy measure (B) is in the top third of the values of (B) for the whole song are considered, to avoid quiet parts of the song (which nevertheless have high spectral flatness measure (C), since white noise has the highest possible spectral flatness measure, and very quiet parts of the music can be close to white noise). For those fingerprints that survive this test, that fingerprint whose surrounding 15 seconds has the highest average spectral flatness measure (C) is selected to be the best fingerprint.

At 350, audio is extracted from the fingerprint selected at 340. A section of fixed duration audio around the location of that fingerprint is used as the thumbnail. It has been found advantageous to place the fingerprint towards the beginning of this section, since the system may identify repeating instrumental passages just prior to the actual chorus. This "audio thumbnail" (e.g., 15 second clip) can then be saved to disk as a separate audio file, for example, or the time offsets defining the location of the thumbnail within the full audio file can be saved in a suitable file (e.g., a playlist .ASX file). If desired, fading can be automatically applied to the beginning and end of the audio using standard techniques, to provide a more pleasing effect.

FIG. 4 illustrates a distortion discriminant analysis system 400 in accordance with an aspect of the present invention. Techniques for audio processing, for example that of extracting features from speech, often use frame durations of order 20 ms. However, in order to reduce computational overhead for the fingerprinting application, it is desirable to generate fingerprints from a stream at about a few times per second. For 20 ms input frames, the step sizes used in the last DDA layer would have to sample at less than the initial sampling rate of 100 Hz, and this can cause aliasing, which will act as a further source of distortion. The system 400 shown in FIG. 4 avoids this problem. There is generally no aliasing since there are no intermediate layers with reduced sampling rate. Because of this requirement, and the requirement that fingerprints be generated at a time scale on the order of about one half second, considerably constrains the possible durations of the first layer frame. Also, the temporally wide first layer allows DDA greater flexibility in choosing the important directions in frequency space.

FIG. 5 illustrates generalized eigenvalues 500 in accordance with an aspect of the present invention. The choice of 64 output dimensions for the first layer of the system 400 described above is guided by the measured generalized eigenspectra on the training data, shown in FIG. 5. Most of the useful information from the first layer is captured in the first 100 projections. The spectrum on the second layer drops off less rapidly. However, to speed up the database lookup, only the top 64 projections on the second layer were considered. The speed of the database lookup could be further increased by a factor of two by only sampling the output every 372 ms rather than every 186 ms.

The stream audio fingerprinting system described above first converts a stereo audio signal to mono and then down samples to 11 025 Hz. The signal is split into fixed-length, 372 ms frames which overlap by half. An MCLT (an overlapping windowed Fourier transform) is then applied to each frame. A log spectrum is generated by taking the log modulus of each MCLT coefficient. The stream audio fingerprinting system performs two per-frame preprocessing steps that suppress specific, easy-to-identify distortions.

The first preprocessing step removes distortions caused by frequency equalization and volume adjustment. This "de-equalization thresholding" step applies a low-pass filter to the log spectrum by taking the DCT of the log spectrum, multiplying each DCT coefficient by a weight which ramps linearly from 1 for the first component to 0 for the sixth and higher components, and then performing an inverse DCT. This results in a smooth approximation A to the log spectrum. A is then uniformly lowered by 6 dB and clipped at −70 dB. The output vector of the first preprocessing step is then the component-wise difference between the log spectrum and if that difference is positive, else zero.

The second preprocessing step removes distortions in the signal that cannot be heard by a human listener. This step exponentiates the log spectrum from the first step, then generates a frequency-dependent perceptual threshold by an algorithm. The final preprocessed signal is then the difference in dB between the log spectrum and the log perceptual threshold, if that difference is positive, and zero otherwise. The final preprocessed data consists of 2048 real coefficients (and thus 2048 bands) per frame.

Figure 6:
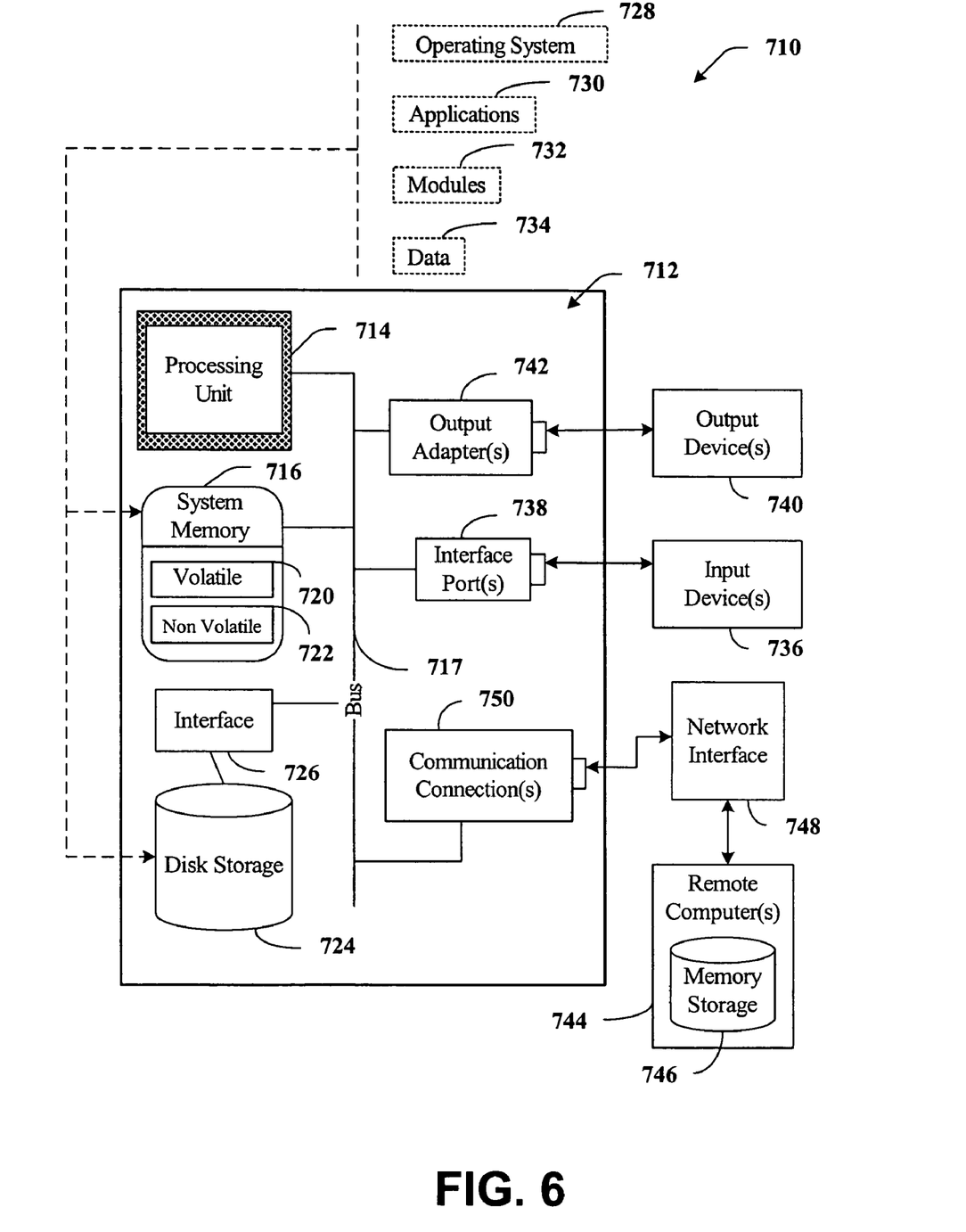
FIG. 6 is a schematic block diagram illustrating a suitable operating environment in accordance with an aspect of the present invention.

With reference to FIG. 6, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/non-volatile computer storage media. FIG. 6 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 6 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 7:
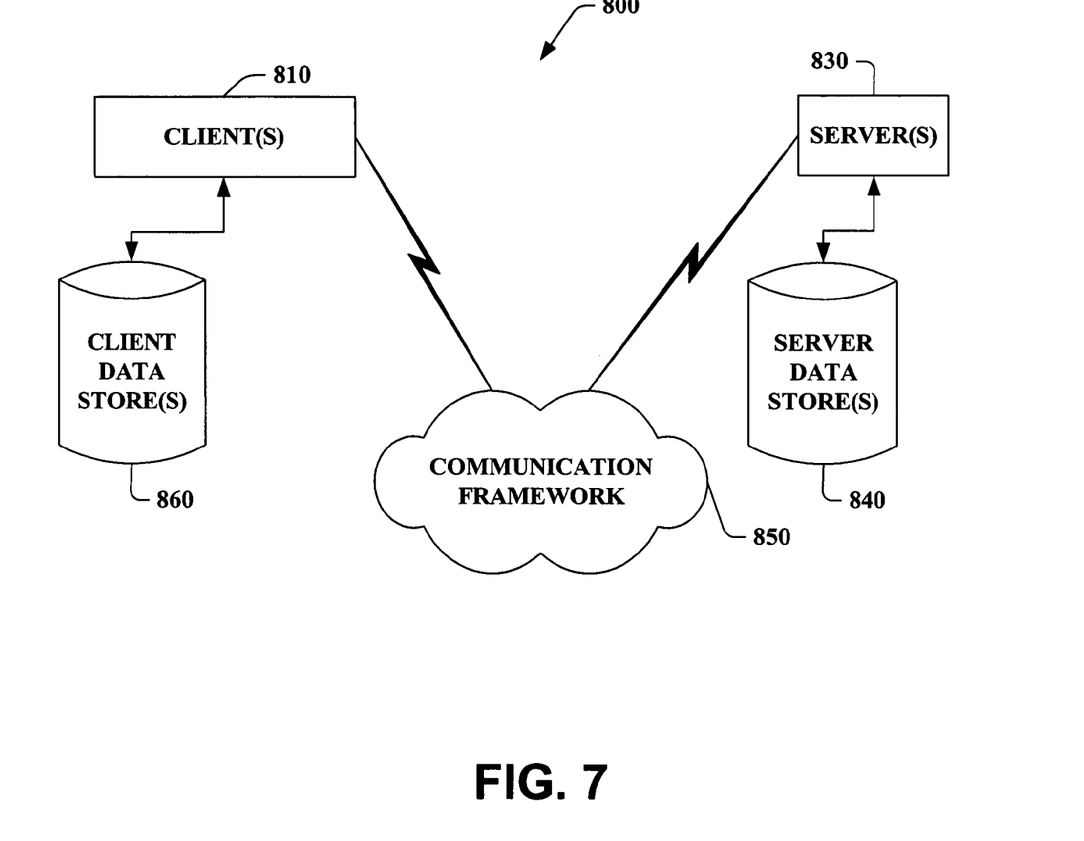
FIG. 7 is a schematic block diagram of a sample-computing environment with which the present invention can interact.

FIG. 7 is a schematic block diagram of a sample-computing environment 800 with which the present invention can interact. The system 800 includes one or more client(s) 810. The client(s) 810 can be hardware and/or software (e.g., threads, processes, computing devices). The system 800 also includes one or more server(s) 830. The server(s) 830 can also be hardware and/or software (e.g., threads, processes, computing devices). The servers 830 can house threads to perform transformations by employing the present invention, for example. One possible communication between a client 810 and a server 830 may be in the form of a data packet adapted to be transmitted between two or more computer processes. The system 800 includes a communication framework 850 that can be employed to facilitate communications between the client(s) 810 and the server(s) 830. The client(s) 810 are operably connected to one or more client data store(s) 860 that can be employed to store information local to the client(s) 810. Similarly, the server(s) 830 are operably connected to one or more server data store(s) 840 that can be employed to store information local to the servers 830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for summarizing audio information, comprising:
   an analyzer to convert audio into frames;
   a fingerprinting component to convert the frames into fingerprints, each fingerprint based in part on a plurality of frames;
   a similarity detector to compute similarities between fingerprints, the similarity detector comprising a clustering function, the clustering function producing one or more sets of clusters of fingerprints based upon all fingerprints within a set of clusters meeting an initial threshold indicative of similarity;
   a heuristic module to generate a thumbnail of the audio file from a set of clusters that has at least two gaps between fingerprints, wherein a gap is a temporal space between two adjacent fingerprints that exceeds a predetermined threshold when fingerprints within a set of clusters are placed in sequential temporal order, the heuristic module comprising a flatness component in order to determine a suitable segment of audio for the thumbnail, the flatness component employs a number that is added to spectral magnitudes for each frequency component, to mitigate numerical problems when determining logs.

2. The system of claim 1, the heuristic module comprising an energy component in order to help determine a suitable segment of audio for the thumbnail.

3. The system of claim 2, the heuristic module is employed to automatically select voiced choruses over instrumental portions.

4. The system of claim 2, the energy component and the flatness component are employed when the fingerprints do not result in finding a suitable chorus.

5. The system of claim 1, further comprising a component to remove silence at the beginning and end of an audio clip via an energy-based threshold.

6. The system of claim 1, the fingerprint component further comprising a normalization component, such that an average Euclidean distance from the each fingerprint to other fingerprints for an audio clip is one.

7. The system of claim 1, the analyzer computes a set of spectral magnitudes for an audio frame.

8. The system of claim 7, for each frame, a mean, normalized energy E is computed by dividing a mean energy per frequency component within the frame by the average of that quantity over frames in an audio file.

9. The system of claim 8, further comprising a component that selects a middle portion of an audio file to mitigate quiet introduction and fades appearing in the audio file.

10. The system of claim 1, the flatness component includes a frame-quantity computed as a log normalized geometric mean of the spectral magnitudes.

11. The system of claim 10, the normalization is performed by subtracting a per-frame log arithmetic mean of a per-frame magnitudes from the geometric mean.

12. The system of claim 1, the heuristic component selects the set of clusters from which to generate the audio thumbnail based upon at least one of a mean spectral quality value determined for the set of clusters or a cluster spread quality value determined for the set of clusters.

13. The system of claim 12, the heuristic component selects the set of clusters that has the highest value for the sum of the square of the mean spectral quality value determined for the set of clusters and the cluster spread quality value determined for the set of clusters.

14. The system of claim 1, the initial threshold is a normalized Euclidian distance between two fingerprints.

15. The system of claim 1, wherein a cluster is a group of fingerprints in a set of clusters that lies between the same two gaps or lies between the beginning of the sequence of fingerprints and the first gap in the sequence or lies between the last gap in the sequence and the end of the sequence of fingerprints.

16. An automatic thumbnail generator, comprising:
means for converting an audio file into frames;
means for fingerprinting the audio file, producing fingerprints based in part on a plurality of frames;
means for producing one or more sets of clusters of fingerprints based upon all fingerprints within a set of clusters meeting a predefined similarity threshold; and
means for creating an audio thumbnail by selecting a set of clusters that has at least two gaps between fingerprints, wherein a gap is a temporal space between two adjacent fingerprints that exceeds a predetermined threshold when fingerprints within a set of clusters are placed in sequential temporal order, determine a suitable segment of audio for the thumbnail by at least employing a number that is added to spectral magnitudes for each frequency component, to mitigate numerical problems when determining logs.

17. A method to generate audio thumbnails, comprising:
generating a plurality of audio fingerprints, each audio fingerprint based in part on a plurality of audio frames;
producing one or more sets of clusters of fingerprints based upon all fingerprints within a set of clusters meeting a similarity threshold;
creating a thumbnail based upon set of clusters that has at least two gaps between fingerprints, wherein a gap is a temporal space between two adjacent fingerprints that exceeds a predetermined threshold when fingerprints within a set of clusters are placed in sequential temporal order; and
clustering fingerprints within a set of clusters into fingerprint clusters based upon the gaps
determining a parameter (D) describing how evenly spread clusters are, temporally, throughout an audio file, (D) is measured as follows:
normalizing a song to have duration of 1;
setting a time position of an i'th cluster bet $_i$;
defining $t_0=0$ and $t_{N+1}=1$; and
computed as $$\frac{(N+1)}{N}\left(1 - \sum_{i=1}^{N+1}(t_i - t_{i-1})^2\right)$$

where N is a number of clusters in a cluster set;
selecting the set of clusters from which to generate the audio thumbnail based upon at least parameter (D).

18. The method of claim 17, the similarity threshold is a normalized Euclidian distance between two fingerprints.

19. The method of claim 17, the similarity threshold chosen adaptively based upon the audio file and used to help determine if two fingerprints belong to the same cluster set.

20. The method of claim 17, the clustering operating by considering one fingerprint at a time.

21. The method of claim 17, further comprising determining an offset and scaling factor so that (D) takes a maximum value of 1 and minimum value of 0, for any N.

22. The method of claim 17, further comprising determining a mean spectral quality for fingerprints in a set.

23. The method of claim 22, wherein a mean spectral flatness for a set, and a parameter D, are combined to determine a best cluster set from among a plurality of cluster sets.

24. The method of claim 23, the mean spectral flatness and parameter D are combined into a single parameter associated with each cluster set, such that the set with the external value of the parameter is selected to be the best set.

25. The method of claim 24, when the best cluster set is selected, a best fingerprint within the cluster set is determined as the fingerprint in which surrounding audio, of duration about equal to a duration of an audio thumbnail, has maximum spectral energy or flatness.

26. The method of claim 17, the creating further comprising determining a cluster by determining a longest section of audio within an audio file that repeats in the audio file.

27. The method of claim 17, the creating further comprising at least one of:
rejecting clusters that are close to a beginning or end of a song;

rejecting clusters for which energy falls below a threshold for any fingerprint in a predetermined window; and selecting a fingerprint having a highest average spectral flatness measure in the predetermined window.

28. The method of claim 17, the creating further comprising generating a thumbnail by specifying time offsets in an audio file.

29. The method of claim 17, the creating further comprising automatically fading a beginning or an end of an audio thumbnail.

30. The method of claim 17, the generating further comprising processing an audio file in at least two layers, where the output of a first layer is based on a log spectrum computed over a small window and a second layer operates on a vector computed by aggregating vectors produced by the first layer.

31. The method of claim 30, further comprising providing a wider temporal window in a subsequent layer than a proceeding layer.

32. The method of claim 31, further comprising employing at least one of the layers to compensate for time misalignment.

* * * * *

UNITED STATES PATENT AND TRADEMARK OFFICE
CERTIFICATE OF CORRECTION

| | | |
|---|---|---|
| PATENT NO. | : 7,379,875 B2 | Page 1 of 1 |
| APPLICATION NO. | : 10/785560 | |
| DATED | : May 27, 2008 | |
| INVENTOR(S) | : Christopher J. C. Burges et al. | |

It is certified that error appears in the above-identified patent and that said Letters Patent is hereby corrected as shown below:

In column 14, line 21, in Claim 17, delete "bet $_i$;" and insert -- be $t_i$; --, therefor.

Signed and Sealed this
Nineteenth Day of April, 2011

David J. Kappos
*Director of the United States Patent and Trademark Office*